United States Patent
Nishihara et al.

(10) Patent No.: US 8,611,760 B2
(45) Date of Patent: Dec. 17, 2013

(54) OPTICAL MODULATION DEVICE AND OPTICAL MODULATION METHOD

(75) Inventors: Masato Nishihara, Kawasaki (JP); Tomoo Takahara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 802 days.

(21) Appl. No.: 12/394,729

(22) Filed: Feb. 27, 2009

(65) Prior Publication Data
US 2009/0226184 A1    Sep. 10, 2009

(30) Foreign Application Priority Data
Feb. 28, 2008  (JP) ................... 2008-048107

(51) Int. Cl.
*H04B 10/00*  (2013.01)
*H04B 10/50*  (2013.01)

(52) U.S. Cl.
CPC ............... *H04B 10/50577* (2013.01)
USPC ............................................. 398/188

(58) Field of Classification Search
USPC ............................................. 398/188
See application file for complete search history.

(56) References Cited

U.S. PATENT DOCUMENTS

| | | |
|---|---|---|
| 2001/0009469 A1 | 7/2001 | Shimizu et al. |
| 2004/0081470 A1 | 4/2004 | Griffin |
| 2007/0065161 A1* | 3/2007 | Miura et al. ............ 398/186 |
| 2007/0212079 A1* | 9/2007 | Ooi et al. ............ 398/198 |
| 2007/0264028 A1 | 11/2007 | Yuki et al. |
| 2011/0176816 A1 | 7/2011 | Ooi et al. |

FOREIGN PATENT DOCUMENTS

| | | |
|---|---|---|
| JP | 10-336154 | 12/1998 |
| JP | 2004-516743 | 6/2004 |
| JP | 2007-82094 | 3/2007 |
| JP | 2007-158415 | 6/2007 |
| JP | 2007-329886 | 12/2007 |

OTHER PUBLICATIONS

Japanese Office Action mailed Mar. 13, 2012 issued in corresponding Japanese Patent Application No. 2008-048107.

* cited by examiner

*Primary Examiner* — Danny Leung
(74) *Attorney, Agent, or Firm* — Staas & Halsey LLP

(57) ABSTRACT

An optical modulation device and method thereof is provided. The optical modulation device includes a decision circuit making a decision with respect to an input data signal in accordance with a timing of a first clock signal, a first modulator modulating light output based on the data signal by the decision circuit; a second modulator modulating the modulated light in accordance with a timing of a second clock signal; and delay controller delaying the first clock signal within a range of a phase margin of a decision circuit, and delaying the second clock signal, thereby controlling a state of a phase difference between the data signal and the second clock signal.

10 Claims, 14 Drawing Sheets

OPTICAL MODULATION DEVICE AND OPTICAL MODULATION METHOD

CROSS-REFERENCE TO RELATED APPLICATIONS

This application is based upon and claims the benefit of priority from the prior Japanese Patent Application No. 2008-048107, filed on Feb. 28, 2008, the entire contents of which are incorporated herein by reference.

BACKGROUND

1. Field

The embodiment(s) discussed herein are related to optical modulation devices and optical modulation methods for performing modulation by a plurality of modulators.

2. Description of the Related Art

In recent years, with an increase in transmission traffic, the demand for introduction of a next-generation 40 Gbps optical transmission system has been growing. Moreover, a 40 Gbps optical transmission system requires a transmission distance and/or a spectral efficiency equivalent to those of a typical 10 Gbps optical transmission system. As a way for realizing such a next-generation 40 Gbps optical transmission system, researches have been conducted on RZ-DPSK (Return to Zero Differential Phase Shift Keying) and/or CS (Carrier-suppressed) RZ-DPSK modulation scheme having high OSNR (Optical Signal Noise Ratio) tolerance and/or nonlinearity tolerance.

FIG. 12 is a block diagram illustrating a configuration of a typical optical modulation device. An optical modulation device 1200 illustrated in FIG. 12 is an optical modulation device that uses an RZ-DQPSK (RZ-Differential Quadrature PSK) scheme at about 40 Gbps. An RZ-DQPSK scheme is expected as a modulation scheme for a next-generation optical transmission system because the RZ-DQPSK scheme has a narrow spectrum (high spectral efficiency) feature (see Japanese Unexamined Patent Application Publication (Translation of PCT Application) No. 2004-516743 and Japanese Unexamined Patent Application Publication No. 2007-158415 described below, for example).

A phase modulator 1210 has two Mach-Zehnder interferometers constituting an I arm and a Q arm, and serves as a DQPSK modulator for performing quadrature phase modulation. The I and Q arms each perform phase modulation at 20 Gbps based on a data signal input to each of the I and Q arms. In the phase modulator 1210, one of the respective signals, on which phase modulation has been performed by the I and Q arms, is phase-shifted (delayed) by $\pi/2$, and is multiplexed with the other signal.

The phase modulator 1210 outputs, as a DQPSK signal, the multiplexed light to an RZ modulator 1220. The RZ modulator 1220 performs, based on a second clock signal input thereto, RZ modulation (pulse carving) on the phase modulated signal output from the phase modulator 1210. The RZ modulator 1220 outputs, as an RZ-DQPSK signal, the RZ modulated signal to the outside.

Decision circuits 1231 and 1232 each serve as a circuit for performing waveform shaping on a data signal input thereto from the outside. The decision circuits 1231 and 1232 each make a decision on the input data signal in accordance with the timing of a first clock signal input thereto, thereby performing waveform shaping on the data signal degraded in a circuit at a preceding stage of the decision circuits 1231 and 1232. The decision circuits 1231 and 1232 output the data signals based on the decision to the phase modulator 1210.

However, in the optical modulation device 1200 described above, the amount of phase delay in a circuit is changed due to temperature variation and/or aging variation (such as age deterioration of the circuit). Because of this change, there arises a problem that the relative phases of the data signal input to the phase modulator 1210 and the second clock signal input to the RZ modulator 1220 are each shifted from the optimal value. If such a phase shift has occurred, the timing of modulation by the phase modulator 1210 and that of modulation by the RZ modulator 1220 with respect to the light to be modulated are deviated from each other.

Specifically, there occurs a phase difference between the DQPSK signal (denoted by the reference numeral 1221 in FIG. 12) output from the phase modulator 1210 to the RZ modulator 1220, and the second clock signal (denoted by the reference numeral 1222 in FIG. 12) input to the RZ modulator 1220. Therefore, the timing of pulse carving by RZ modulation is deviated from the timing of modulation of the DQPSK signal, resulting in optical signal degradation.

FIG. 13 is a graph describing a relationship between the phase difference and Q value penalty. In FIG. 13, the horizontal axis represents the phase difference [ps] between the DQPSK signal output from the phase modulator 1210 to the RZ modulator 1220, and the second clock signal input to the RZ modulator 1220. The vertical axis in FIG. 13 represents the Q value penalty [dB] of the optical signal output from the RZ modulator 1220. A characteristic 1302 represents a change in the Q value penalty of the optical signal with respect to the phase difference represented by the horizontal axis.

As indicated by the characteristic 1302, the greater the phase difference between the DQPSK signal and the second clock signal, the greater the Q value penalty of the optical signal. A threshold value 1303 is provided as a threshold value at which the Q value penalty represented by the vertical axis becomes 0.1 dB. If the Q value penalty is allowed to 0.1 dB, the allowable phase difference range is between about −6 ps and about +6 ps. In this regard, consideration may be given to the idea of compensating the phase difference between the DQPSK signal and the second clock signal by using temperature monitor information (see Japanese Unexamined Patent Application Publication No. 2007-158415, for example). However, in this case, there arises a problem that information on temperature dependence, aging variation characteristic, individual variation, etc. is needed in advance for feedforward control, thus making it difficult to perform high-precision phase difference control.

Further, in this regard, consideration may be given to the idea of controlling the relative phases of the data signal input to the phase modulator 1210 and the second clock signal input to the RZ modulator 1220, thereby compensating the phase difference between the DQPSK signal input to the RZ modulator 1220 and the second clock signal input to the RZ modulator 1220.

However, if the phase of the first clock signal is greatly changed in order to change the phase of the data signal input to the phase modulator 1210, the phase difference between the data signal and the first clock signal in each of the decision circuits 1231 and 1232 is increased. As a result, it becomes difficult to make a decision on the data signal by each of the decision circuits 1231 and 1232. Further, since the phase difference between the data signal and the first clock signal also varies depending on temperature variation and/or aging variation, the phase margin, which allows a decision to be made on the data signal, is small.

Therefore, it has been difficult to change the phase of the data signal input to the phase modulator 1210. In this regard, consideration may be given to the idea of changing the phase of the second clock signal in order to control the phase difference between the data signal and the second clock signal.

FIG. 14 is a diagram describing an operation performed in changing the phase of the second clock signal. In FIG. 14, the horizontal axis represents time. A waveform 1411 represents the data signal (DQPSK optical signal) input to the RZ modulator 1220. A dotted line 1421 represents the center of one cycle of the data signal. A waveform 1412 represents the second clock signal input to the RZ modulator 1220. And a dotted line 1422 represents the center of one cycle of the second clock signal.

The compensation of the phase difference between the data signal and the second clock signal is equivalent to the bringing of the dotted line 1421 and the dotted line 1422 close to each other. When the phase of only the second clock signal is changed, the delay amount of the second clock signal (indicated by the left-pointing arrow) needs to be increased, and a significant delay variable range is needed in a phase shifter for delaying the second clock signal.

At a frequency as high as 20 GHz or more in particular, it is technically difficult to increase the delay variable range of a phase shifter, and a plurality of phase shifters have to be provided in order to realize an increase in the delay variable range. In addition, in this case, there arises a problem that the insertion loss of the second clock signal is increased. Furthermore, there arises a problem that the cost of circuits such as a new phase shifter, a driver amplifier, etc. is increased.

SUMMARY

According to an aspect of an embodiment, an optical modulation device includes a decision circuit for making a decision with respect to an input data signal in accordance with a timing of a first clock signal, a first modulator for modulating light output based on the data signal by the decision circuit, a second modulator for modulating the modulated light in accordance with a timing of a second clock signal, and a delay controller for delaying the first clock signal within a range of a preset phase margin of the decision circuit, and for delaying the second clock signal, thereby controlling a state of a phase difference between the data signal and the second clock signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
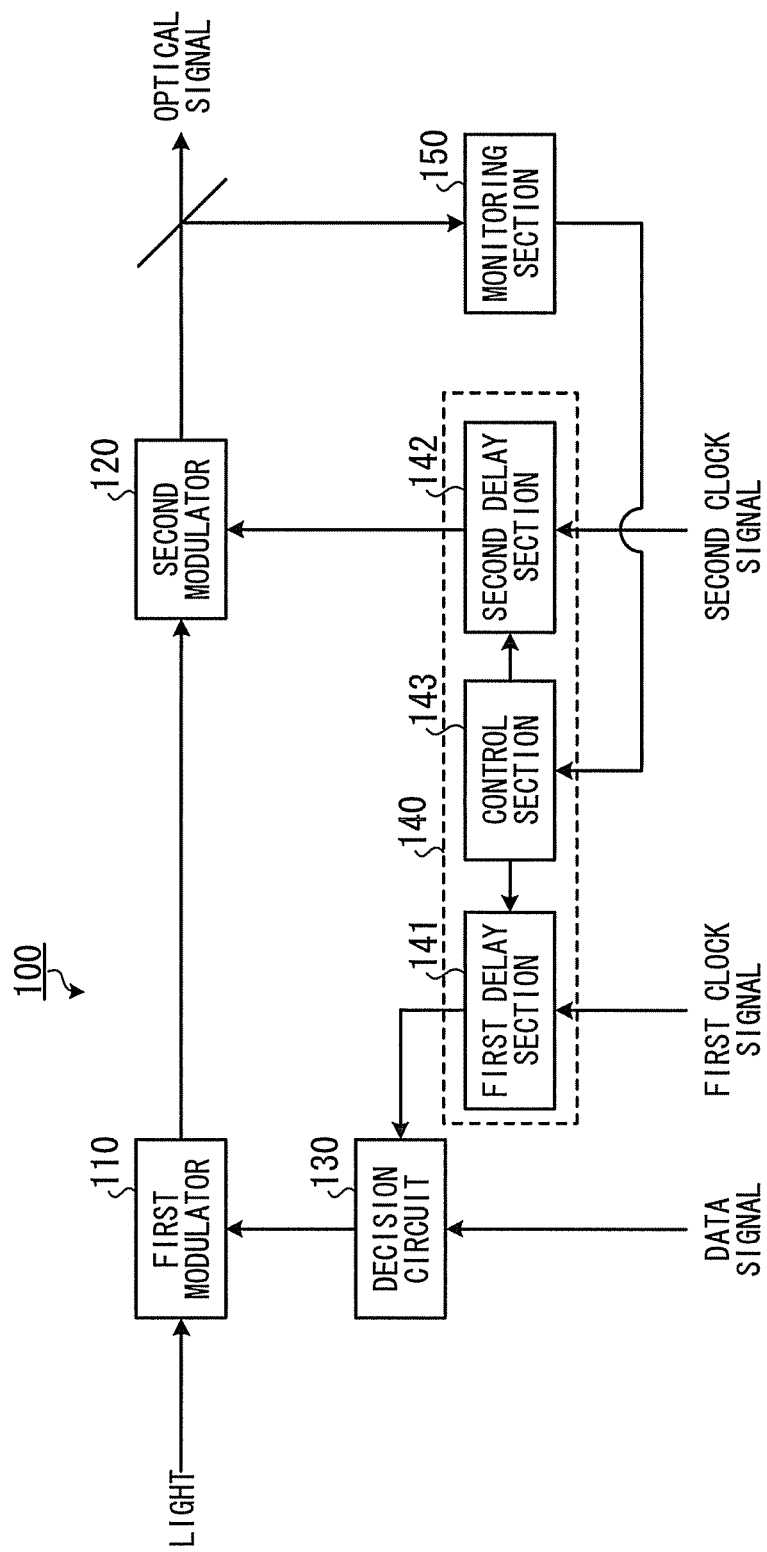
FIG. 1 is a block diagram illustrating a general outline of a configuration of an embodiment.

Reference will now be made in detail to the embodiments, examples of which are illustrated in the accompanying drawings, wherein like reference numerals refer to the like elements throughout. The embodiments are described below to explain the present invention by referring to the figures.

Hereinafter, preferred embodiments of optical modulation devices and optical modulation methods according to the present invention will be described in detail with reference to the appended drawings.

FIG. 1 is a block diagram illustrating a general outline of a configuration of an embodiment.

As illustrated in FIG. 1, an optical modulation device 100 according to an embodiment includes: a first modulator 110; a second modulator 120; a decision circuit 130; a delay control section 140; and a monitoring section 150. The first modulator 110 and the second modulator 120 may be connected in series. The first modulator 110 and the second modulator 120 may serve as modulators for performing different modulations on the same light.

Light may be input to the first modulator 110 from outside of the modulation device 100. The light input to the first modulator 110 may be a CW (Continuous Wave) light, for example. Further, a data signal output from the decision circuit 130 may be input to the first modulator 110. The first modulator 110 modulates the light input from the outside based on the data signal output from the decision circuit 130. The first modulator 110 outputs the modulated light to the second modulator 120.

The light output from the first modulator 110 may be input to the second modulator 120. Further, a second clock signal may be input to the second modulator 120 from the outside via the delay control section 140. The second modulator 120 modulates the light output from the first modulator 110 in accordance with a timing of the second clock signal. The second modulator 120 outputs, as an optical signal, the modulated light to the outside.

A data signal may be input to the decision circuit 130 from the outside. Further, a first clock signal may be input to the decision circuit 130 from the outside via the delay control section 140. The decision circuit 130 makes a decision with respect to an input data signal in accordance with a timing of the first clock signal. The decision circuit 130 outputs the decided data signal to the first modulator 110. Accordingly, the phase of the data signal input to the first modulator 110 may be decided in accordance with the timing of the first clock signal.

The delay control section 140 includes: a first delay section 141; a second delay section 142; and a control section 143. The first delay section 141 delays, based on a variable delay amount, the first clock signal input to the decision circuit 130 from the outside. The second delay section 142 delays, based on a variable delay amount, the second clock signal input to the second modulator 120 from the outside.

The control section 143 controls the respective delay amounts in the first delay section 141 and the second delay section 142, thereby controlling the state of a phase difference between the data signal and the second clock signal. Specifically, the control section 143 controls the respective delay amounts of the first clock signal and the second clock signal so as to decrease the phase difference indicated by information output from the monitoring section 150.

The phase difference between the data signal and the second clock signal refers to a relative phase difference between the data signal input to the first modulator 110 and the second clock signal input to the second modulator 120 when the relative modulation timings of the first modulator 110 and the second modulator 120 are optimized. The state in which the relative modulation timings are optimized refers to a state in which the respective modulation cycles of the first modulator 110 and the second modulator 120 with respect to the light to be modulated coincide with each other.

Accordingly, strictly speaking, when a propagation time of an optical path length from the first modulator 110 to the second modulator 120 coincides with the delay time of the second clock signal input to the second modulator 120 with respect to the data signal input to the first modulator 110, there exists no phase difference between the data signal and the second clock signal. On the other hand, when there exists a phase difference between the data signal and the second clock signal, the respective modulation cycles of the first modulator 110 and the second modulator 120 with respect to the light to be modulated deviate from each other.

Furthermore, the control section 143 controls the delay amount of the first clock signal in the first delay section 141 within a range of a phase margin of the decision circuit 130. The range of the phase margin of the decision circuit 130 refers to the range of a phase difference between the data signal and first clock signal input to the decision circuit 130, which sufficiently allows a decision to be made on the data signal in the decision circuit 130. The range of the phase margin of the decision circuit 130 may be decided in advance by a test, for example.

Further, in an initial state (e.g., a state in which the phase difference between the data signal and the first clock signal is substantially 0), the range of the phase margin of the decision circuit 130 may be obtained by subtracting, from the range that sufficiently allows a decision to be made on the data signal, a variation in the phase difference between the data signal and the first clock signal caused due to temperature variation and/or aging variation. Thus, even if temperature variation and/or aging variation have/has occurred, the delay amount of the first clock signal can be controlled within the range that sufficiently allows a decision to be made on the data signal.

The monitoring section 150 monitors the phase difference between the data signal and the second clock signal. The monitoring section 150 outputs information, indicative of the monitored phase difference, to the delay control section 140. In an embodiment, the monitoring section 150 branches part of the optical signal to be output to the outside from the second modulator 120, and monitors the phase difference between the data signal and the second clock signal based on a result of monitoring of the branched optical signal.

It should be noted that in an embodiment, the optical modulation device 100 is configured so that the second modulator 120 is provided at a subsequent stage of the first modulator 110, but the optical modulation device 100 may alternatively be configured so that the second modulator 120 is provided at a preceding stage of the first modulator 110. Further, as respective modulation schemes for the first modulator 110 and the second modulator 120, various schemes such as phase modulation and intensity modulation may be used. For example, data modulation performed using a multi-phase modulation scheme may be applied to the first modulator 110, while RZ modulation performed using an intensity modulation scheme may be applied to the second modulator 120. Further, while FIG. 1 illustrates the delay control section 140 as having specific components, the present invention is not limited to particular components. For example, some or all of the operations may be executed via a single component.

Figure 2:
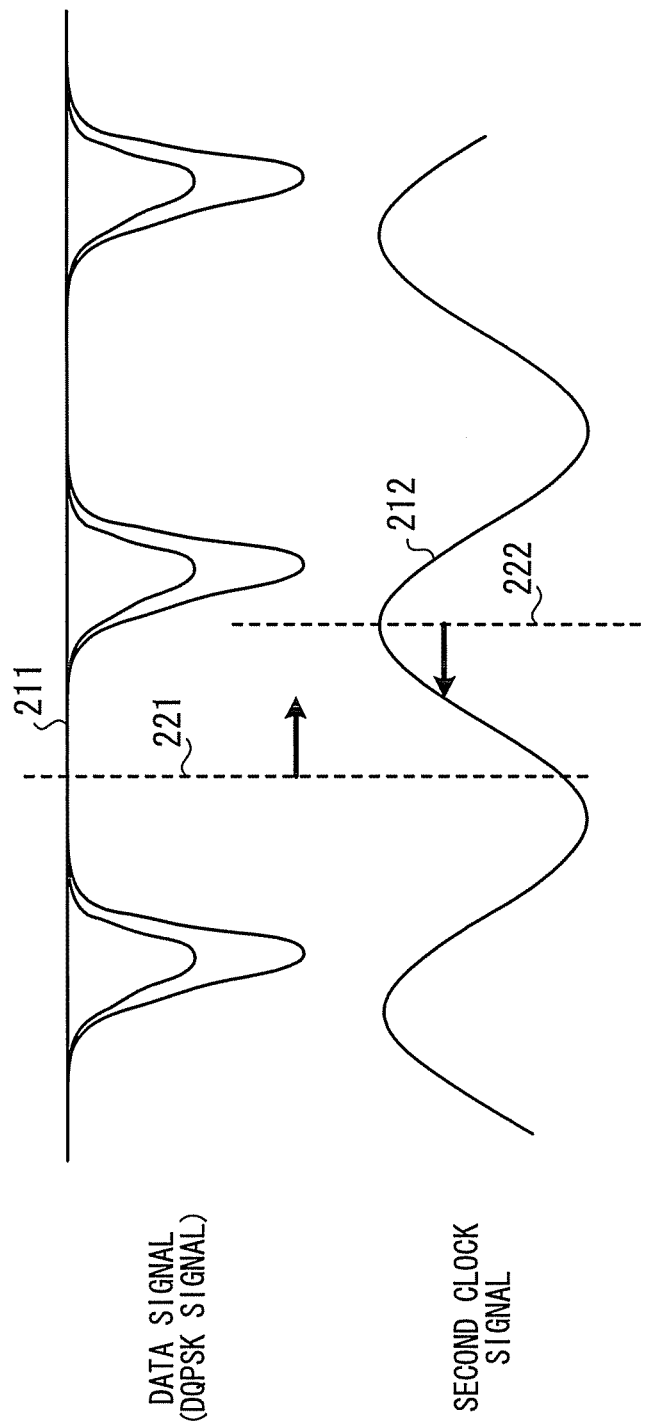
FIG. 2 is a diagram describing a general outline of an operation performed in an embodiment.

FIG. 2 is a diagram describing a general outline of an operation performed in an embodiment. In FIG. 2, the horizontal axis represents time. A waveform 211 represents the data signal input to the second modulator 120. In an embodiment, the first modulator 110 may be a DQPSK modulator, and the data signal represented by the waveform 211 may be a DQPSK data signal. A dotted line 221 represents the center of one cycle of the data signal. A waveform 212 represents the second clock signal input to the second modulator 120. And a dotted line 222 represents the center of one cycle of the second clock signal.

The delay control section 140 changes the respective delay amounts of the data signal and the second clock signal or the delay amount of either the data signal or the second clock signal so that the dotted line 221 and the dotted line 222 approximately coincide with each other. The optical modulation device 100 not only changes the delay amount of the second clock signal (as indicated by the left-pointing arrow), but also changes the delay amount of the data signal (as indicated by the right-pointing arrow). Thus, in controlling the phase difference between the data signal and the second clock signal, the delay amounts of the data signal and the second clock signal to be changed (which are indicated by the lengths of the respective arrows) can be reduced.

Figure 3:
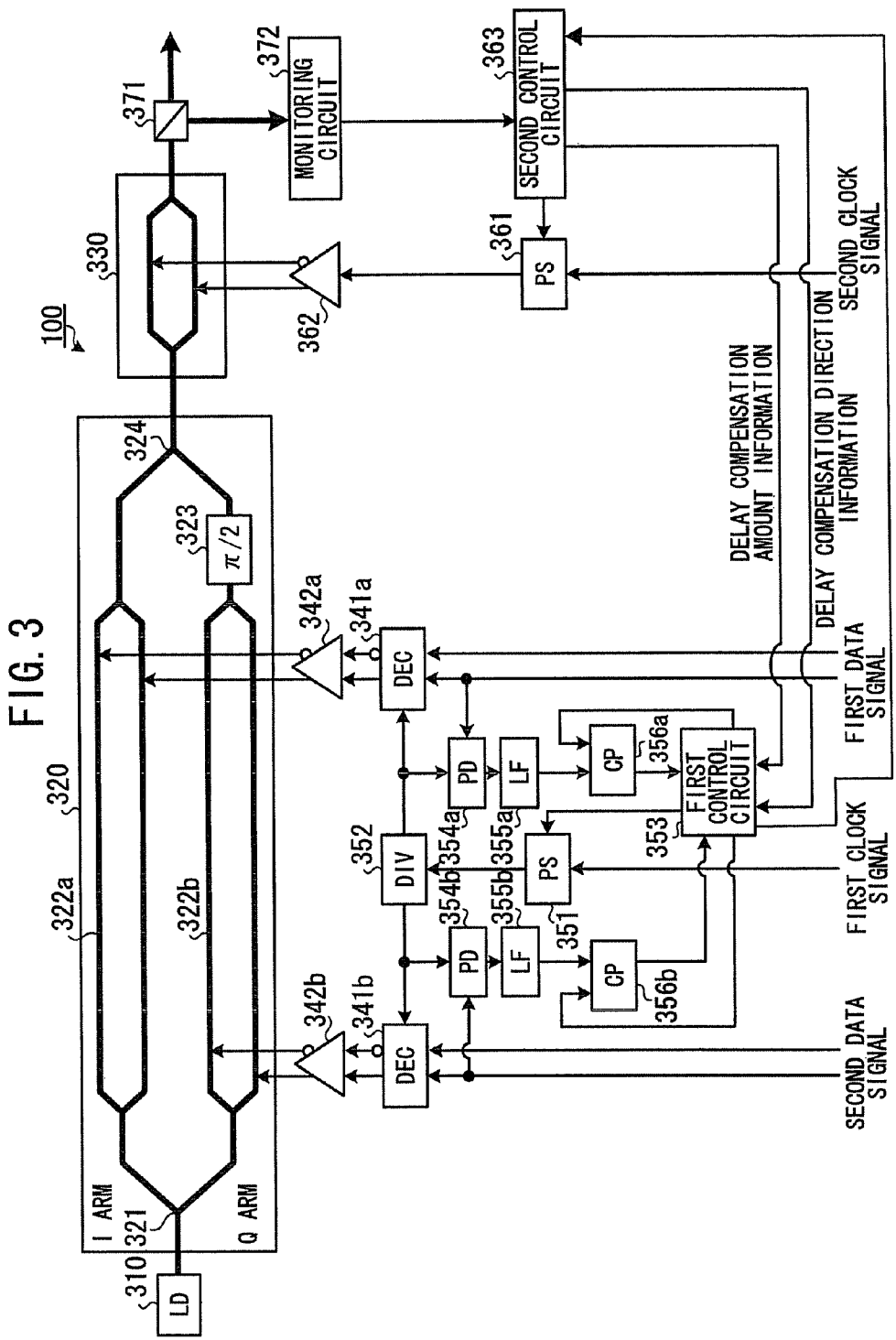
FIG. 3 is a block diagram illustrating a configuration of an optical modulation device according to an embodiment.

FIG. 3 is a block diagram illustrating a configuration of an optical modulation device according to an embodiment. An optical modulation device 100 illustrated in FIG. 3 may serve as an RZ-DQPSK modulator for performing differential quadrature phase shift keying and RZ modulation. Further, the optical modulation device 100 performs modulation at a bit rate of about 40 Gbps (at a baud rate of 20 Gbps). In FIG. 3, the flow of light is indicated by thick lines, and the flow of electricity is indicated by normal lines.

In order to perform differential quadrature phase shift keying, a first data signal and a second data signal (data signals of two channels) may be input to a phase modulator 320 of the optical modulation device 100. Each of the first data signal and the second data signal in FIG. 3 may be a data signal including a normal signal and an inversion signal, but does not have to be a differential signal. In the following description, the first and second data signals will be simply referred to as the "first data signal" and the "second data signal", respectively. The first data signal and the second data signal each serve as a binary data signal.

As illustrated in FIG. 3, the optical modulation device 100 according to an embodiment includes: a light source 310; the phase modulator 320; an RZ modulator 330; decision circuits 341a and 341b; driver amplifiers 342a and 342b; a first phase shifter 351; a power divider 352; a first control circuit 353; phase detectors 354a and 354b; loop filters 355a and 355b; comparators 356a and 356b; a second phase shifter 361; a driver amplifier 362; a second control circuit 363; an optical coupler 371; and a monitoring circuit 372.

The light source 310 generates a continuous wave light to output the generated light to the phase modulator 320. The light source 310 may be formed by an LD (Laser Diode) in an embodiment. The phase modulator 320 has a configuration corresponding to that of the first modulator 110 illustrated in FIG. 1. The phase modulator 320 may serve as a DQPSK modulator including two Mach-Zehnder interferometers constituting an I arm and a Q arm.

The phase modulator 320 includes: a branching section 321; a phase modulation section 322a; a phase modulation section 322b; a phase shift section 323; and a multiplexing section 324. The branching section 321 branches the continuous wave light output from the light source 310. The branching section 321 outputs the respective branched continuous wave lights to the phase modulation section 322a and the phase modulation section 322b.

The phase modulation section 322a may be the Mach-Zehnder interferometer constituting the I arm in the DQPSK modulator. The phase modulation section 322a performs, based on the first data signal output from the driver amplifier 342a, binary phase modulation on the continuous wave light output from the branching section 321. The phase modulation section 322a outputs the phase modulated optical signal to the multiplexing section 324.

The phase modulation section 322b may be the Mach-Zehnder interferometer constituting the Q arm in the DQPSK modulator. The phase modulation section 322b performs, based on the second data signal output from the driver amplifier 342b, binary phase modulation on the continuous wave light output from the branching section 321. The phase modulation section 322b outputs the phase modulated optical signal to the phase shift section 323. The phase shift section 323 delays, by $\pi/2$, the phase of the optical signal output from the phase modulation section 322b. Any configuration may be applied to the phase shift section 323 as long as a phase difference between the I arm and the Q arm becomes $\pi/2$. For example, the arms may each be provided with a phase shifter so as to change a shift amount in a complementary manner. The phase shift section 323 outputs the delayed optical signal to the multiplexing section 324. The multiplexing section 324 multiplexes the optical signal output from the phase modulation section 322a with the optical signal output from the phase shift section 323. The multiplexing section 324 outputs the multiplexed optical signal to the RZ modulator 330.

The RZ modulator 330 has a configuration corresponding to that of the second modulator 120 illustrated in FIG. 1. Based on a second clock signal output from the driver amplifier 362, the RZ modulator 330 performs RZ modulation (pulse carving) on the optical signal output from the phase modulator 320. The RZ modulator 330 outputs the RZ modulated optical signal to the monitoring circuit 372.

The decision circuits 341a and 341b each have a configuration corresponding to that of the decision circuit 130 illustrated in FIG. 1. The first data signal may be input to the decision circuit (DEC) 341a (at about 20 Gbps in an embodiment). In accordance with the timing of a first clock signal output from the first phase shifter 351, the decision circuit 341a makes a decision with respect to the input first data signal, and outputs the first data signal to the driver amplifier 342a. The driver amplifier 342a amplifies the first data signal output from the decision circuit 341a, and outputs the amplified first data signal to the phase modulator 320.

The second data signal may be input to the decision circuit (DEC) 341b (at 20 Gbps in an embodiment). In accordance with the timing of the first clock signal output from the first phase shifter 351, the decision circuit 341b makes a decision with respect to the input second data signal, and outputs the second data signal to the driver amplifier 342b. The driver amplifier 342b amplifies the second data signal output from the decision circuit 341b, and outputs the amplified second data signal to the phase modulator 320. Each of the decision circuits 341a and 341b may be a DFF (Delay Flip-Flop) circuit, for example.

The first phase shifter 351, the power divider 352, the first control circuit 353, the phase detectors 354a and 354b, the loop filters 355a and 355b, the comparators 356a and 356b, and the second control circuit 363 have configurations corresponding to that of the delay control section 140 illustrated in FIG. 1. The first phase shifter 351 has a configuration corresponding to that of the first delay section 141 illustrated in FIG. 1.

The first clock signal may be input to the first phase shifter (PS) 351 from the outside (at 20 GHz in an embodiment). The first phase shifter 351 may serve as a delay circuit for delaying the input first clock signal based on a variable delay amount, and for outputting the delayed first clock signal to the power divider (DIV) 352. Further, the first phase shifter 351 changes the delay amount of the first clock signal in response to a drive voltage supplied from the first control circuit 353.

The power divider 352 equally branches the first clock signal output from the first phase shifter 351 into two signals. The power divider 352 outputs the respective branched first clock signals, having the same phase and the same quality, to the decision circuit 341a and the decision circuit 341b. The first control circuit 353, the phase detectors 354a and 354b, the loop filters 355a and 355b, the comparators 356a and 356b, and the second control circuit 363 have configurations corresponding to that of the control section 143 illustrated in FIG. 1.

The phase detector 354a makes a comparison between the first clock signal input to the decision circuit 341a from the power divider 352, and the first data signal input to the decision circuit 341a from the outside. The phase detector 354a outputs a voltage, indicative of the phase difference between the compared first clock signal and first data signal, to the comparator 356a via the loop filter 355a.

The phase detector 354b makes a comparison between the first clock signal input to the decision circuit 341b from the power divider 352, and the second data signal input to the decision circuit 341b from the outside. The phase detector 354b outputs a voltage, indicative of the phase difference between the compared first clock signal and second data signal, to the comparator 356b via the loop filter 355b.

The loop filter 355a allows only a low frequency component of the voltage output from the phase detector 354a to the comparator 356a to be passed through the loop filter 355a. Thus, the voltage output to the comparator 356a may be provided as a voltage indicative of the average of the phase difference between the first clock signal and the first data signal. The loop filter 355a may be formed by a low-pass filter, for example.

The loop filter 355b allows only a low frequency component of the voltage output from the phase detector 354b to the comparator 356b to be passed through the loop filter 355b. Thus, the voltage output to the comparator 356b may be provided as a voltage indicative of the average of the phase difference between the first clock signal and the second data signal. The loop filter 355b may be formed by a low-pass filter, for example.

The comparator 356a makes a comparison between a reference voltage output from the first control circuit 353, and the voltage that is output from the phase detector 354a and indicative of the phase difference. When the voltage indicative of the phase difference is lower than the reference voltage, the comparator 356a outputs "Low" to the first control circuit 353, and when the voltage indicative of the phase difference is higher than the reference voltage, the comparator 356a outputs "High" to the first control circuit 353.

The comparator 356b makes a comparison between the reference voltage output from the first control circuit 353, and the voltage that is output from the phase detector 354b and indicative of the phase difference. When the voltage indicative of the phase difference is lower than the reference voltage, the comparator 356b outputs "Low" to the first control circuit 353, and when the voltage indicative of the phase difference is higher than the reference voltage, the comparator 356b outputs "High" to the first control circuit 353.

The first control circuit 353 supplies the drive voltage to the first phase shifter 351. The first control circuit 353 varies the drive voltage to be supplied on a per-variation basis, thereby controlling the amount of delay of the first clock signal caused by the first phase shifter 351. Further, the first control circuit 353 switches the direction, in which the drive voltage to be supplied is varied, in accordance with a delay compensation direction indicated by information output from the second control circuit 363.

In an embodiment, upon increase of the drive voltage, the first phase shifter 351 increases the delay amount. For example, when the delay compensation direction indicated by the information output from the second control circuit 363 is the direction in which the first clock signal is relatively delayed with respect to the second clock signal, the first control circuit 353 increases the drive voltage to be supplied to the first phase shifter 351. Thus, the amount of delay of the first clock signal caused by the first phase shifter 351 is increased, thereby making it possible to relatively delay the first clock signal with respect to the second clock signal.

On the other hand, when the delay compensation direction indicated by the information output from the second control circuit 363 is the direction in which the second clock signal is relatively delayed with respect to the first clock signal, the first control circuit 353 decreases the drive voltage to be supplied to the first phase shifter 351. Thus, the amount of delay of the first clock signal caused by the first phase shifter 351 is decreased, thereby making it possible to relatively delay the second clock signal with respect to the first clock signal.

Further, the first control circuit 353 controls the drive voltage to be supplied to the first phase shifter 351 so that the phase difference indicated by the voltage output from the phase detector 354a is within a range of the phase margin of the decision circuit 341a, and that the phase difference indicated by the voltage output from the phase detector 354b is within a range of the phase margin of the decision circuit 341b. Specifically, information on the phase margins of the decision circuit 341a and the decision circuit 341b may be preset in the first control circuit 353.

Furthermore, the first control circuit 353 acquires information that is output from the second control circuit 363 and indicative of a delay compensation amount. The first control circuit 353 calculates a reference voltage responsive to the delay compensation amount indicated by information output from the second control circuit 363. The reference voltage refers to a voltage equivalent to a variation in the phase difference between each first clock signal and each data signal input to the decision circuit 341a and the decision circuit 341b when the delay amount of the first clock signal is changed by the delay compensation amount.

When the calculated reference voltage is within the range of the phase margin of the decision circuit 341a and within the range of the phase margin of the decision circuit 341b, the first control circuit 353 performs the above-described control of the drive voltage, and outputs the calculated reference voltage to each of the comparator 356a and the comparator 356b. Then, upon switching of at least one of pieces of information output from the comparator 356a and the comparator 356b from "Low" to "High" or from "High" to "Low", the first control circuit 353 maintains the drive voltage being supplied at this time.

On the other hand, when the calculated reference voltage falls outside at least one of the range of the phase margin of the decision circuit 341a and the range of the phase margin of the decision circuit 341b, the first control circuit 353 outputs a control instruction to the second control circuit 363 without requiring performance of the above-described control of the drive voltage. Then, upon output of the control instruction to the second control circuit 363, the second control circuit 363 controls the delay amount of the second clock signal.

The second clock signal may be input to the second phase shifter 361 from the outside (at 20 GHz in an embodiment). The second phase shifter 361 delays the input second clock signal based on a variable delay amount, and outputs the delayed second clock signal to the driver amplifier 362. Further, the second phase shifter 361 changes the delay amount of the second clock signal in response to a drive voltage supplied from the second control circuit 363.

The driver amplifier 362 amplifies the second clock signal output from the second phase shifter 361, and outputs the amplified second clock signal to the RZ modulator 330. The optical coupler 371 branches part of the optical signal output from the RZ modulator 330, and outputs the branched optical signal to the monitoring circuit 372. The monitoring circuit 372 has a configuration corresponding to that of the monitoring section 150 illustrated in FIG. 1. The first data signal and the second data signal have the same phase. Hereinafter, the first data signal and the second data signal will be referred to as "each data signal".

The monitoring circuit 372 monitors the state of a phase difference between each data signal and the second clock signal. The monitoring circuit 372 outputs information indicative of the monitored state of the phase difference to the second control circuit 363. The information indicative of the state of the phase difference includes information on the amount of the phase difference between each data signal and the second clock signal, and information on the direction of the phase difference between each data signal and the second clock signal.

The information on the direction of the phase shift refers to information indicative of either the phase shift direction in which each data signal is delayed with respect to the second clock signal, or the phase shift direction in which the second clock signal is delayed with respect to each data signal. Based on the information that is output from the monitoring circuit 372 and indicative of the state of the phase difference, the second control circuit 363 calculates the delay compensation amount and the delay compensation direction. The delay compensation amount may be a phase delay amount equivalent to the phase difference amount indicated by the information output from the monitoring circuit 372.

When the phase difference direction indicated by the information output from the monitoring circuit 372 is the direction in which the second clock signal is delayed with respect to each data signal, the delay compensation direction is the direction in which each data signal is delayed with respect to the second clock signal. When the phase difference direction indicated by the information output from the monitoring circuit 372 is the direction in which each data signal is delayed with respect to the second clock signal, the delay compensation direction is the direction in which the second clock signal is delayed with respect to each data signal.

The second control circuit 363 outputs information indicative of the delay compensation amount and the delay compensation direction (i.e., delay compensation amount information and delay compensation direction information) to the first control circuit 353. Further, after having output the information indicative of the delay compensation amount and the delay compensation direction, the second control circuit 363 controls the drive voltage supplied to the second phase shifter 361 upon output of the control instruction from the first control circuit 353.

In an embodiment, the second phase shifter 361 increases the delay amount upon increase of the drive voltage. Specifically, when the calculated delay compensation direction is the direction in which each data signal is delayed with respect to the second clock signal, the second control circuit 363 increases the drive voltage to be supplied to the second phase shifter 361. The amount of the drive voltage increased by the second control circuit 363 may be an amount by which the delay amount of the second clock signal in the second phase shifter 361 becomes the calculated delay compensation amount.

On the other hand, when the calculated delay compensation direction is the direction in which the second clock signal is delayed with respect to each data signal, the second control circuit 363 decreases the drive voltage to be supplied to the second phase shifter 361. The amount of the drive voltage decreased by the second control circuit 363 may be an amount by which the delay amount of the second clock signal in the second phase shifter 361 coincides with the calculated delay compensation amount.

Figure 4:
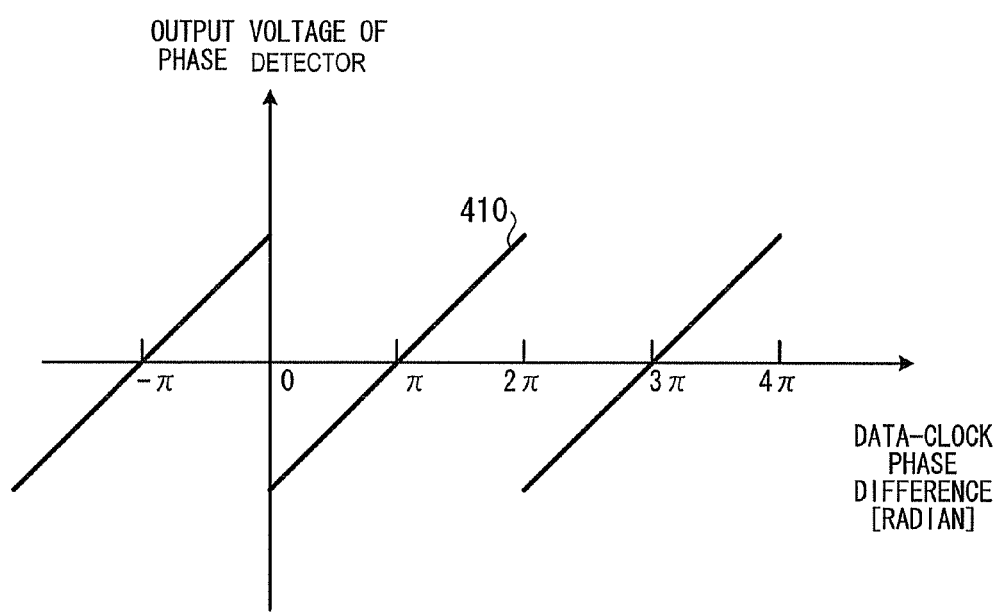
FIG. 4 is a graph describing how a phase detector illustrated in FIG. 3 is operated.

FIG. 4 is a graph describing how the phase detector illustrated in FIG. 3 is operated. In an embodiment, the phase detector 354a will be described. In FIG. 4, the horizontal axis represents a phase difference (i.e., a data-clock phase difference [radian]) between the data signal input to the decision circuit 341a from outside of a modulation device, and the first clock signal input to the decision circuit 341a from the power divider 352. The vertical axis in FIG. 4 represents an output voltage of the phase detector 354a.

A characteristic 410 represents a characteristic of a voltage output from the phase detector 354a with respect to the phase difference represented by the horizontal axis. As represented by the characteristic 410, the phase detector 354a outputs a voltage having a value monotonically increasing from a state in which no phase difference exists (or a state in which the phase difference is 0, $2\pi$, $4\pi$, ...) to a state in which the phase difference is changed in one cycle. In this case, the phase detector 354a outputs a voltage having a value increasing linearly from the state in which no phase difference exists to the state in which the phase difference is changed in one cycle.

As the phase detector 354a having this characteristic 410, a Hogge phase detector (see C. R. Hogge, Jr., Journal of Lightwave Technology, 1985) may be used, for example. In an embodiment, the phase detector 354a has been described, but the phase detector 354b may be operated similarly to the phase detector 354a.

It should be noted that FIG. 4 describes an example in which a voltage having a value monotonically increasing from a state in which no phase difference exists to a state in which the phase difference is changed in one cycle; however, the phase detector 354a may be a circuit for outputting a voltage having a value monotonically decreasing from a state in which no phase difference exists to a state in which the phase difference is changed in one cycle.

Figure 5:
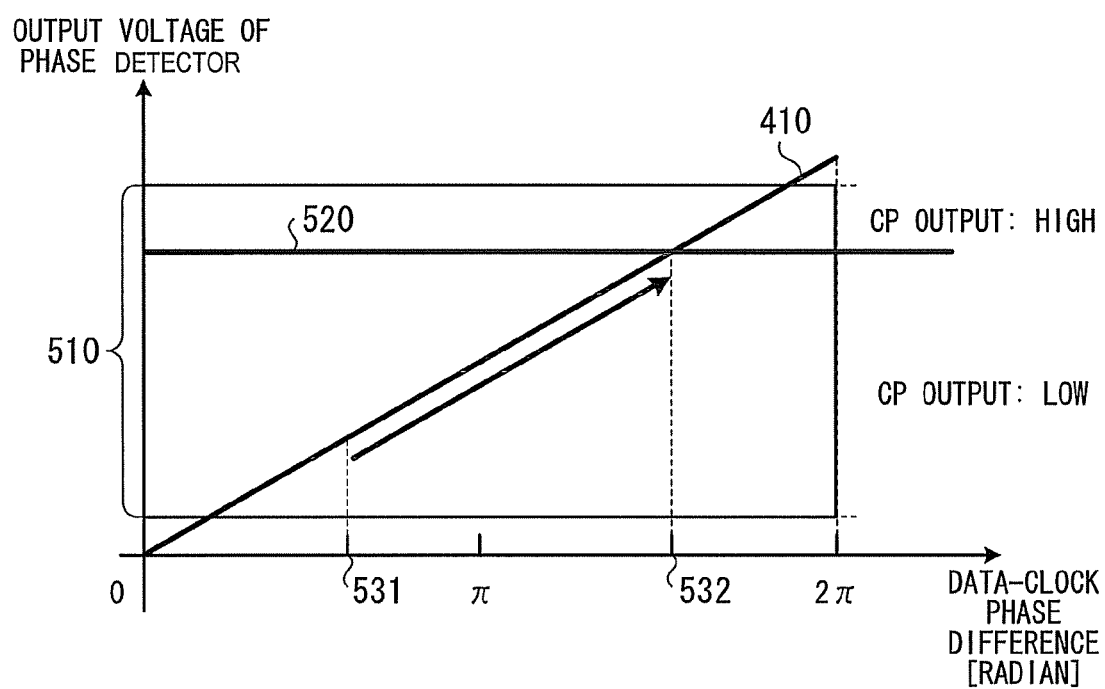
FIG. 5 is a graph describing how a first control circuit illustrated in FIG. 3 is operated.

FIG. 5 is a graph describing how the first control circuit illustrated in FIG. 3 is operated. In an embodiment, operations concerning the phase detector 354a will be described. In FIG. 5, the horizontal axis represents one cycle (0 to $2\pi$) of the phase difference (i.e., the data-clock phase difference [radian]) between the first data signal input to the decision circuit 341a from the outside, and the first clock signal input to the decision circuit 341a from the power divider 352. The vertical axis in FIG. 5 represents an output voltage of the phase detector 354a.

A vertical axis range 510 may be a range of a phase margin of the decision circuit 341a. A reference voltage 520 may be a reference voltage calculated by the first control circuit 353. In this graph, since the reference voltage 520 is within the range 510, the first control circuit 353 controls the drive voltage to be supplied to the first phase shifter 351. Upon output of the information indicative of the delay compensation amount and the delay compensation direction from the second control circuit 363, the phase difference between the first clock signal and the first data signal enters a state indicated by the reference numeral 531.

In this case, since the output voltage from the phase detector 354a is lower than the reference voltage 520, the comparator 356a outputs "Low" to the first control circuit 353. The first control circuit 353 varies the drive voltage on a per-variation basis, thereby increasing the phase difference between the first clock signal and the first data signal. Then, when the phase difference between the first clock signal and the first data signal has entered a state indicated by the reference numeral 532, the output voltage from the phase detector 354a would be determined to be above the reference voltage 520.

In this case, since the output voltage from the phase detector 354a is higher than the reference voltage 520, the output from the comparators 356a to the first control circuit 353 may be switched from "Low" to "High". The first control circuit 353 stops the control of the drive voltage to be supplied to the first phase shifter 351, and maintains the drive voltage being supplied to the first phase shifter 351 at this time. Thus, the phase difference between the first data signal and the second clock signal can be compensated.

Although the operations concerning the phase detector 354a have been described in an embodiment, the operations concerning the phase detector 354b may be similar to those concerning the phase detector 354a. Further, for example, the first control circuit 353 monitors both of the output from the comparator 356a and the output from the comparator 356b, stops the control of the drive voltage upon switching of either of the outputs from "Low" to "High" or from "High" to "Low", and maintains the drive voltage being supplied to the first phase shifter 351 at this time.

Figure 6:
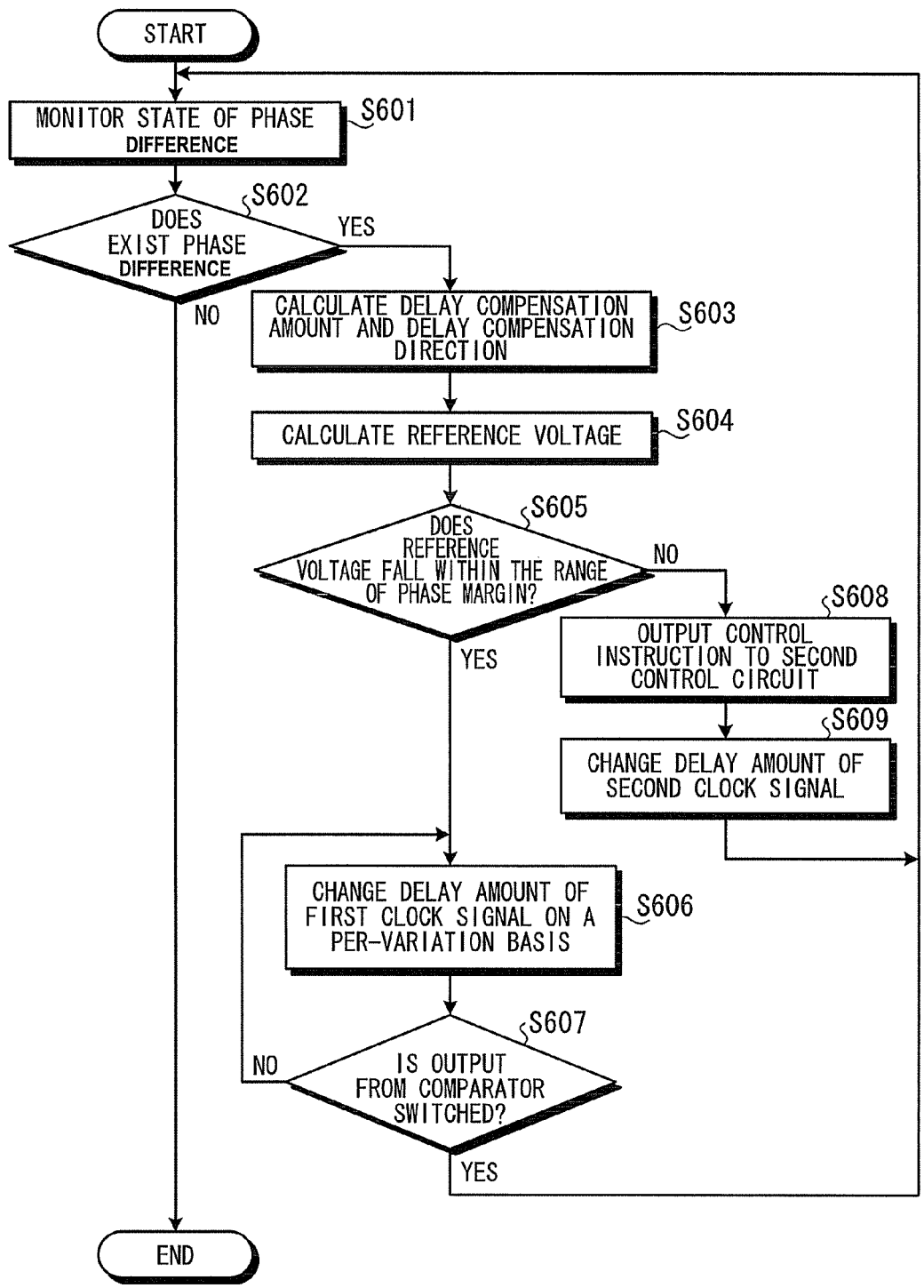
FIG. 6 illustrates an example of how an optical modulation device illustrated in FIG. 3 is operated.

FIG. 6 illustrates an example of how the optical modulation device illustrated in FIG. 3 is operated. As illustrated in FIG. 6, a state of a phase difference between each data signal and the second clock signal is monitored, for example by the monitoring circuit 372 (Operation 601). Next, based on a monitoring result of Operation 601, it is determined, for example via the second control circuit 363 determines whether or not there exists a phase difference (Operation 602).

When there exists a phase difference in Operation 602 (i.e., when the answer is Yes in Operation 602), the second control circuit 363, for example, calculates a delay compensation amount and a delay compensation direction based on the monitoring result of Operation 601 (Operation 603). Next, the first control circuit 353, for example, calculates a reference voltage based on the delay compensation amount calculated in Operation 603 (Operation 604).

Then, the first control circuit 353, for example, determines whether or not the reference voltage calculated in Operation 604 falls within the range of the phase margin (see the range 510 in FIG. 5) (Operation 605). When the reference voltage falls within the range of the phase margin (i.e., when the answer is Yes in Operation 605), the first control circuit 353 varies (adjusts or changes) the delay amount of the first clock signal on a per-variation basis (Operation 606).

Subsequently, the first control circuit 353 determines whether or not at least one of the respective outputs ("Low" or "High") from the comparator 356a and the comparator 356b has been switched (Operation 607). When neither of the respective outputs from the respective comparators has been switched (i.e., when the answer is No in Operation 607), the process may be returned to Operation 606 to continue the process.

When at least one of the respective outputs from the respective comparators has been switched (i.e., when the answer is Yes in Operation 607), the process may be returned to Operation 601 to continue the process. When the reference voltage falls outside the range of the phase margin in Operation 605 (i.e., when the answer is No in Operation 605), the first control circuit 353, for example, outputs a control instruction to the second control circuit 363 (Operation 608).

Next, the second control circuit 363 changes the delay amount of the second clock signal in accordance with the delay compensation amount and the delay compensation direction calculated in Operation 603 (Operation 609), and then the process may be returned to Operation 601 to continue the process. When there exists no phase difference in Operation 602 (i.e., when the answer is No in Operation 602), a series of the process operations will be ended. By repeating the above-described process as needed, even if a phase difference between each data signal and the first clock signal has occurred due to temperature variation and/or aging variation, the varied phase difference can be compensated in real time.

Figure 7:
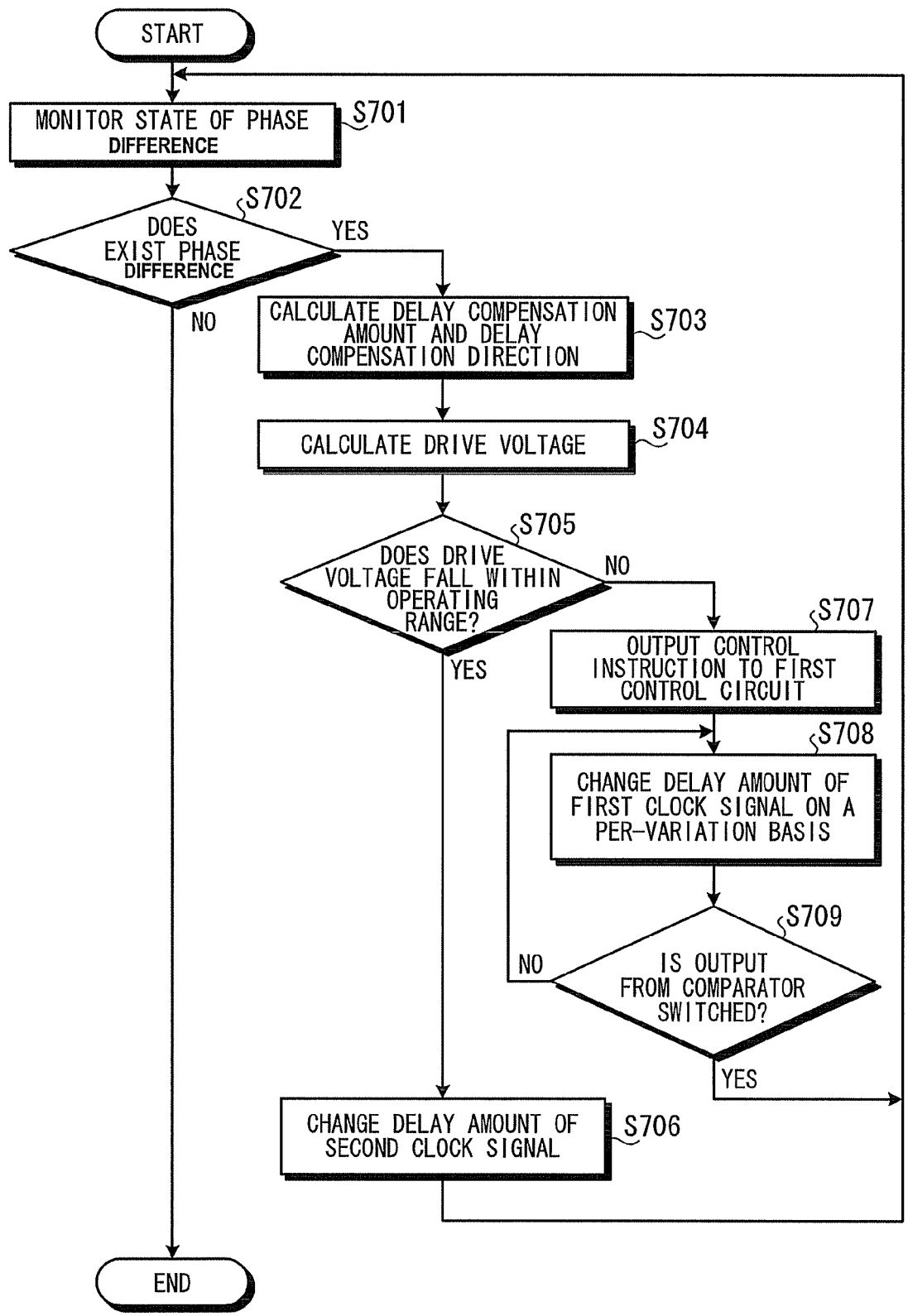
FIG. 7 illustrates another example of how an optical modulation device illustrated in FIG. 3 is operated.

FIG. 7 illustrates another example of how the optical modulation device illustrated in FIG. 3 is operated. Referring to FIG. 6, the description has been made on the operation(s) performed to decide which of the delay amount of the first clock signal and the delay amount of the second clock signal should be controlled based on whether or not the delay compensation amount falls outside the range of the phase margin of the decision circuit; however, a decision may be made on which of the delay amount of the first clock signal and the delay amount of the second clock signal should be controlled based on whether or not the delay compensation amount falls outside the operating range of the second phase shifter 361.

First, the monitoring circuit 372, for example, monitors a state of a phase difference between each data signal and the second clock signal (Operation 701). Next, based on a monitoring result of Operation 701, the second control circuit 363, for example, determines whether or not there exists a phase difference (Operation 702). When there exists a phase difference (i.e., when the answer is Yes in Operation 702), the second control circuit 363 calculates a delay compensation amount and a delay compensation direction based on the monitoring result of Operation 701 (Operation 703).

Next, the second control circuit 363, for example, calculates a drive voltage for the second phase shifter 361 based on the delay compensation amount calculated in Operation 703 (Operation 704). Then, the second control circuit 363 determines whether or not the drive voltage calculated in Operation 704 falls within the operating range of the second phase shifter 361 (Operation 705).

When the drive voltage falls within the operating range of the second phase shifter 361 in Operation 705 (i.e., when the answer is Yes in Operation 705), the second control circuit 363 changes the delay amount of the second clock signal in accordance with the delay compensation amount and the delay compensation direction calculated in Operation 703 (Operation 706), and the process may be returned to Operation 701 to continue the process.

When the drive voltage falls outside the operating range of the second phase shifter 361 in Operation 705 (i.e., when the answer is No in Operation 705), the second control circuit 363 outputs a control instruction to the first control circuit 353 (Operation 707). Next, the first control circuit 353 varies (changes or adjusts) the delay amount of the first clock signal on a per-variation basis (Operation 708).

Subsequently, the first control circuit 353 determines whether or not at least one of the respective outputs ("Low" or "High") from the comparator 356a and the comparator 356b has been switched (Operation 709). When neither of the respective outputs from the respective comparators has been switched (i.e., when the answer is No in Operation 709), the process may be returned to Operation 708 to continue the process.

When at least one of the respective outputs from the respective comparators has been switched (i.e., when the answer is Yes in Operation 709), the process may be returned to Operation 701 to continue the process. When there exists no phase difference in Operation 702 (i.e., when the answer is No in Operation 702), a series of the process operations will be ended. By repeatedly performing the above-described process, even if a phase difference between each data signal and the first clock signal has occurred due to temperature variation and/or aging variation, the varied phase difference can be compensated in real time.

As described above, the optical modulation device 100 according to an embodiment controls the delay amount of the second clock signal and that of the first clock signal, thereby making it possible to increase the variable range of the compensation amount with respect to the phase difference between the data signal and the second clock signal. Thus, even if the phase difference between the data signal and the second clock signal is great, relative timings of the modulation performed by the phase modulator 320 and the modulation performed by the RZ modulator 330 are allowed to correspond to each other. Therefore, the modulation characteristic for the optical signal can be improved.

Further, the phase margin of each of the decision circuits 341a and 341b may be preset, and the delay amount of the first clock signal may be controlled within the range of the set phase margin, thereby making it possible to control the phase difference between the data signal and the second clock signal without degrading the decision quality of the decision circuits 341a and 341b for the data signals.

Furthermore, for the first phase shifter 351 for delaying the first clock signal, a typical phase shifter for controlling the relative phases of the data signal and the first clock signal input to each of the decision circuits 341a and 341b may be used. Therefore, even if no new particular phase shifter is provided, the modulation characteristic for the optical signal can be improved.

Figure 8:
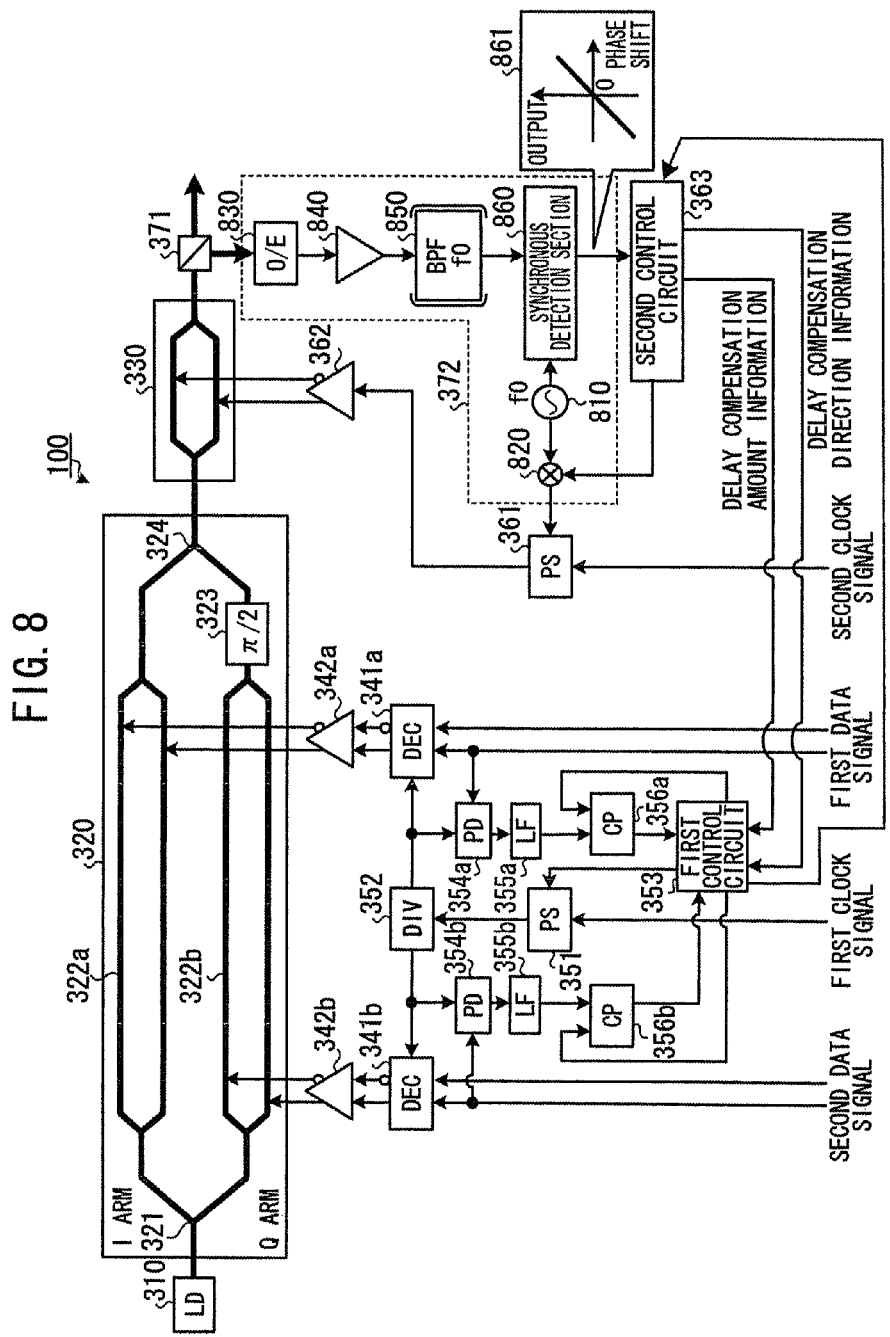
FIG. 8 is a block diagram illustrating a configuration of an optical modulation device according to an embodiment.

FIG. 8 is a block diagram illustrating a configuration of an optical modulation device according to an embodiment. In FIG. 8, the same components as those illustrated in FIG. 3 are identified by the same reference numerals, and the description thereof will be omitted. In the optical modulation device 100 according to an embodiment, the monitoring circuit 372 of the optical modulation device 100 according to the above-described embodiment is replaced with one having a specific configuration described below.

As illustrated in FIG. 8, the monitoring circuit 372 includes: an oscillation circuit 810; a multiplication circuit 820; an optical/electrical conversion section 830; a TIA 840; a band pass filter 850; and a synchronous detection section 860. The oscillation circuit 810 oscillates a signal with a predetermined frequency. The signal with a predetermined frequency may be a low frequency signal with a frequency f0 (e.g., 1 kHz) that is sufficiently low with respect to each clock signal and/or each data signal. The oscillation circuit 810 outputs the oscillated low frequency signal to the multiplication circuit 820 and the synchronous detection section 860.

The multiplication circuit 820 multiplies the drive voltage output from the second control circuit 363 by the low frequency signal output from the oscillation circuit 810. The multiplication circuit 820 outputs the multiplied drive voltage to the second phase shifter 361. Thus, the drive voltage to be supplied to the second phase shifter 361 may be varied by the frequency f0, and the delay amount of the second clock signal may be varied by the frequency f0.

The optical/electrical conversion section 830 receives the optical signal output from the optical coupler 371, and converts the received optical signal into an electric signal. The optical/electrical conversion section 830 outputs the converted electric signal to the TIA 840. The optical/electrical conversion section 830 may be a PD (Photodiode), for example. The TIA (Transimpedance Amplifier) 840 amplifies the electric signal output from the optical/electrical conversion section 830, and outputs the amplified electric signal to the band pass filter 850.

The band pass filter (BPF) 850 extracts a component whose frequency is close to f0 out of the electric signal output from the TIA 840. Thus, the noise of the electric signal output from the TIA 840 can be reduced. The band pass filter 850 outputs the extracted electric signal to the synchronous detection section 860. It should be noted that the band pass filter 850 may be omitted in an embodiment.

The synchronous detection section 860 performs synchronous detection based on the low frequency signal output from the oscillation circuit 810, and the electric signal output from the band pass filter 850. The synchronous detection section 860 performs the synchronous detection, thereby extracting a component of the frequency f0 identical to the low frequency signal from the electric signal output from the band pass filter 850. The synchronous detection section 860 outputs the extracted f0 component of the electric signal to the second control circuit 363.

A graph 861 describes information related to a relationship between the phase difference (horizontal axis) caused between the first clock signal and the second clock signal, and the electric signal (vertical axis) output from the synchronous detection section 860. As described in the graph 861, the electric signal output from the synchronous detection section 860 increases in proportion to the phase difference caused between the first clock signal and the second clock signal. When the phase difference caused between the first clock signal and the second clock signal is 0, the electric signal output from the synchronous detection section 860 becomes 0. Further, depending on the direction of the phase difference caused between the first clock signal and the second clock signal, the electric signal output from the synchronous detection section 860 becomes positive or negative.

The second control circuit 363 outputs the delay compensation amount/direction information to the first control circuit 353 and the drive voltage for the second phase shifter 361 to the multiplication circuit 820. Further, based on the f0 component of the electric signal output from the synchronous detection section 860, the second control circuit 363 controls the delay amount of the second clock signal in the second phase shifter 361. Specifically, the drive voltage to be supplied to the second phase shifter 361 may be controlled so that the f0 component of a monitor signal output from the band pass filter 850 is minimized, or the synchronous detection characteristic output from the synchronous detection section 860 becomes a value close to 0 (zero).

It should be noted that the description has been made on the assumption that the monitoring circuit 372 is provided in addition to the phase modulator 320 and the RZ modulator 330 to monitor the optical signal in an embodiment; however, when a Mach-Zehnder interferometer having an MMI coupler at its output section is used as an example of the RZ modulator 330, the optical modulation device may alternatively be configured so that one output of the MMI coupler is connected to the optical/electrical conversion section 830, and a normal phase signal or a reverse phase signal detected by the optical/electrical conversion section 830 is output as a monitor signal to the TIA 840.

As described above, the optical modulation device 100 according to an embodiment achieves the effects of the optical modulation device 100 according to the above-described embodiment; furthermore, the optical modulation device 100 varies the phase of the second clock signal by a low frequency, and extracts a low frequency component of the optical signal modulated by the phase modulator 320 and the RZ modulator 330, thereby making it possible to monitor the state of the phase difference between the first clock signal and the second clock signal.

Figure 9:
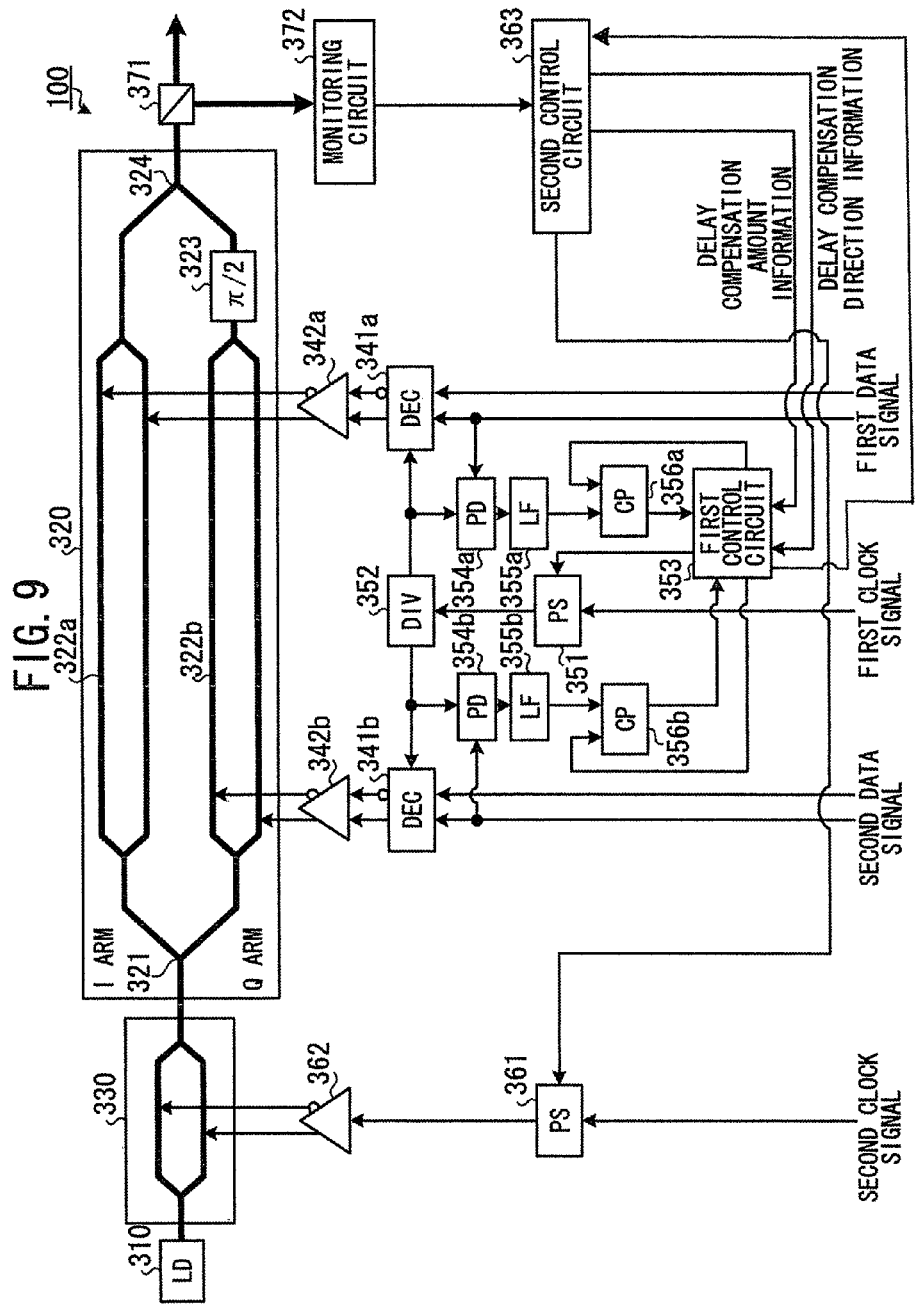
FIG. 9 is a block diagram illustrating a configuration of an optical modulation device according to an embodiment.

FIG. 9 is a block diagram illustrating a configuration of an optical modulation device according to an embodiment. In FIG. 9, the same components as those illustrated in FIG. 3 are identified by the same reference numerals, and the description thereof will be omitted. Referring to FIG. 3, the configuration in which the RZ modulator 330 is provided at a subsequent stage of the phase modulator 320 has been described, but the optical modulation device may alternatively be configured so that the RZ modulator 330 is provided at a preceding stage of the phase modulator 320. The light source 310 generates a continuous wave light to output the generated light to the RZ modulator 330.

The RZ modulator 330 performs RZ modulation on the optical signal output from the light source 310. The RZ modulator 330 outputs the RZ modulated optical signal to the phase modulator 320. The branching section 321 of the phase modulator 320 branches the optical signal output from RZ modulator 330. The multiplexing section 324 of the phase modulator 320 outputs the multiplexed optical signal to the outside. The optical coupler 371 branches part of the optical signal to be output to the outside from the phase modulator 320, and outputs the branched optical signal to the monitoring circuit 372.

As described above, the optical modulation device 100 according to an embodiment enables an increase in the variable width of the compensation amount with respect to the phase difference between the data signal and the second clock signal similarly to the optical modulation device 100 according to an embodiment. Therefore, the modulation characteristic for the optical signal can be improved. Further, it is possible to control the phase difference between each data signal and the second clock signal without degrading the decision quality of the decision circuits 341a and 341b for the data signals. Furthermore, there is no need to provide any new phase shifter.

Figure 10:
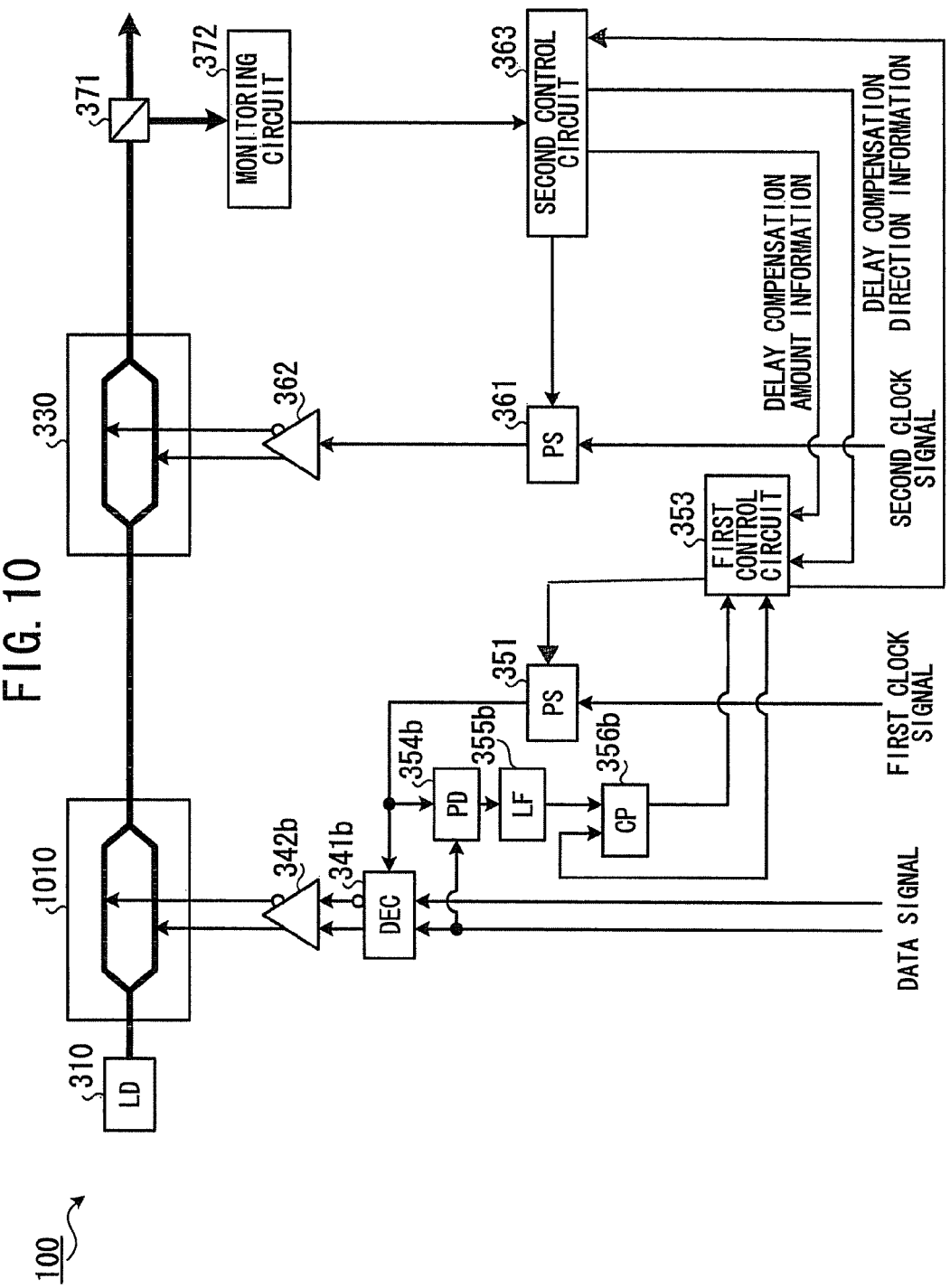
FIG. 10 is a block diagram illustrating a configuration of an optical modulation device according to an embodiment.

FIG. 10 is a block diagram illustrating a configuration of an optical modulation device according to an embodiment. In FIG. 10, the same components as those illustrated in FIG. 3 are identified by the same reference numerals, and the description thereof will be omitted. Referring to FIG. 3, the configuration in which the DQPSK phase modulator 320 is provided as the first modulator 110 (see FIG. 1) has been described, but the optical modulation device may alternatively be configured so that a DPSK phase modulator 1010 is provided as the first modulator 110.

In this case, the optical modulation device 100 may serve as an RZ-DPSK modulation device for performing differential binary phase shift keying and RZ modulation. In order to perform differential binary phase shift keying, a binary data signal of a single system may be input to the phase modulator 1010. The data signal may be one including a normal signal and an inversion signal, but will be simply referred to as the "data signal" in the following description.

Further, in this case, the optical modulation device 100 has a configuration in which the decision circuit 341a, the driver amplifier 342a, the power divider 352, the phase detector 354a, the loop filter 355a, and the comparator 356a are removed from the configuration illustrated in FIG. 3. The light source 310 generates a continuous wave light to output the generated light to the phase modulator 1010.

The phase modulator 1010 may be a DPSK modulator including a single Mach-Zehnder interferometer. The phase modulator 1010 performs, based on the data signal output from the driver amplifier 342b, binary phase modulation on the continuous wave light output from the light source 310. The phase modulator 1010 outputs the phase modulated optical signal to the RZ modulator 330.

The RZ modulator 330 performs RZ modulation on the optical signal output from the phase modulator 1010. The data signal may be input to the decision circuit 341b. The driver amplifier 342b amplifies the data signal output from the decision circuit 341b, and outputs the amplified data signal to the phase modulator 1010. The first phase shifter 351 may serve as a delay circuit for delaying the input first clock signal based on a variable delay amount, and for outputting the delayed first clock signal to the decision circuit 341b.

The phase detector 354b makes a comparison between the first clock signal input to the decision circuit 341b from the first phase shifter 351, and the data signal input to the decision circuit 341b from the outside. The first control circuit 353 controls the drive voltage to be supplied to the first phase shifter 351 so that the phase difference indicated by the voltage output from the phase detector 354b falls within the range of the phase margin of the decision circuit 341b. Specifically, information on the phase margin of the decision circuit 341b may be preset in the first control circuit 353.

When the calculated reference voltage falls within the range of the phase margin of the decision circuit 341b, the first control circuit 353 performs the above-described control of the drive voltage, and outputs the calculated reference voltage to the comparator 356b. Then, upon switching of each piece of information output from the comparator 356b from "Low" to "High" or from "High" to "Low", the first control circuit 353 maintains the drive voltage being supplied at this time. On the other hand, when the calculated reference voltage falls outside the range of the phase margin of the decision circuit 341b, the first control circuit 353 outputs a control instruction to the second control circuit 363 without performing the above-described control of the drive voltage.

As described above, the optical modulation device 100 according to an embodiment enables an increase in the variable range of the compensation amount with respect to the phase difference between the data signal and the second clock signal similarly to the optical modulation device 100 according to an embodiment. Therefore, the modulation characteristic for the optical signal can be improved. Further, it is possible to control the phase difference between the data signal and the second clock signal without degrading the decision quality of the decision circuit 341b for the data signal. Furthermore, the modulation characteristic for the optical signal can be improved even if no new phase shifter is provided.

Figure 11:
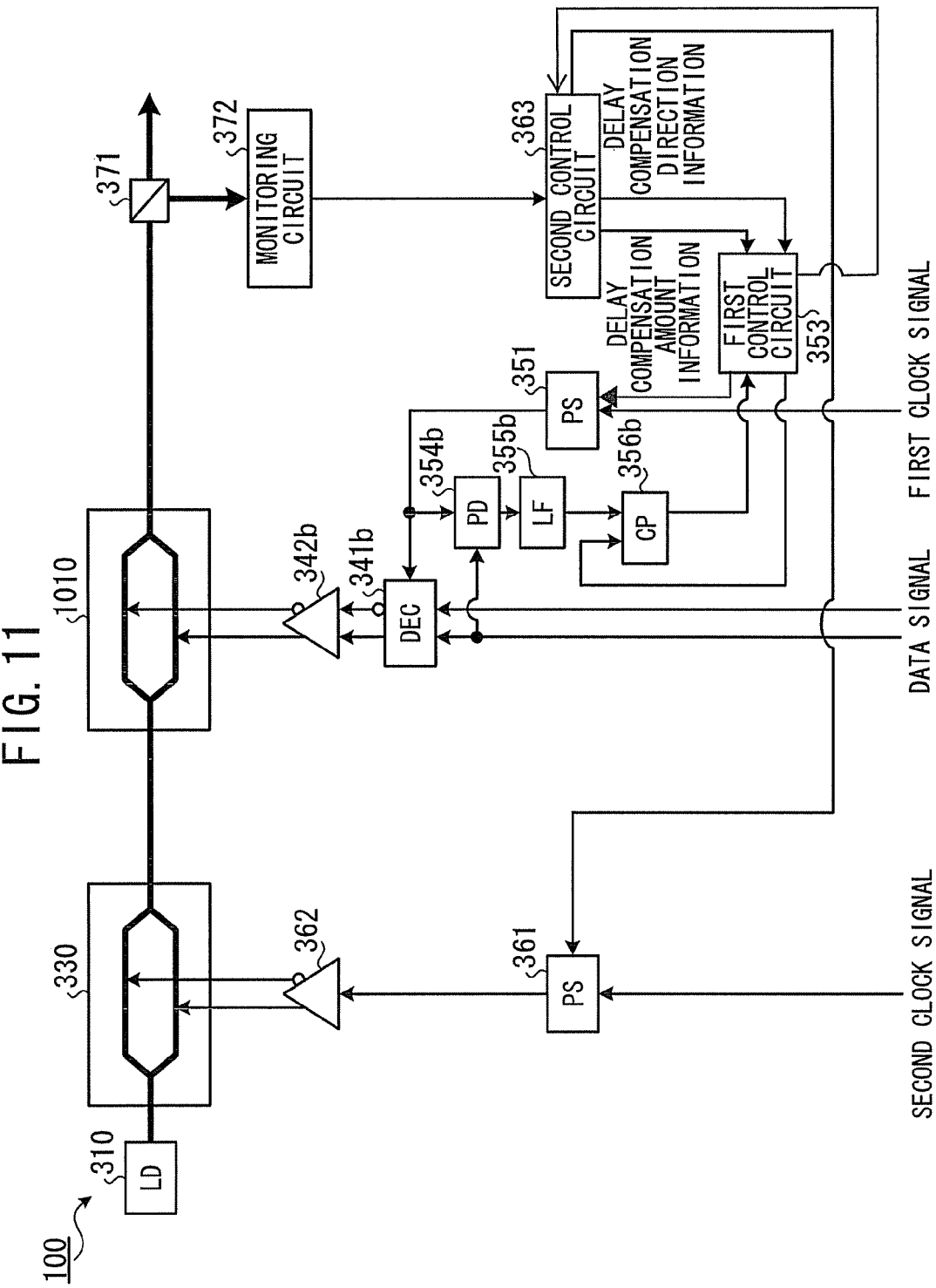
FIG. 11 is a block diagram illustrating a configuration of an optical modulation device according to an embodiment.
Figure 12:
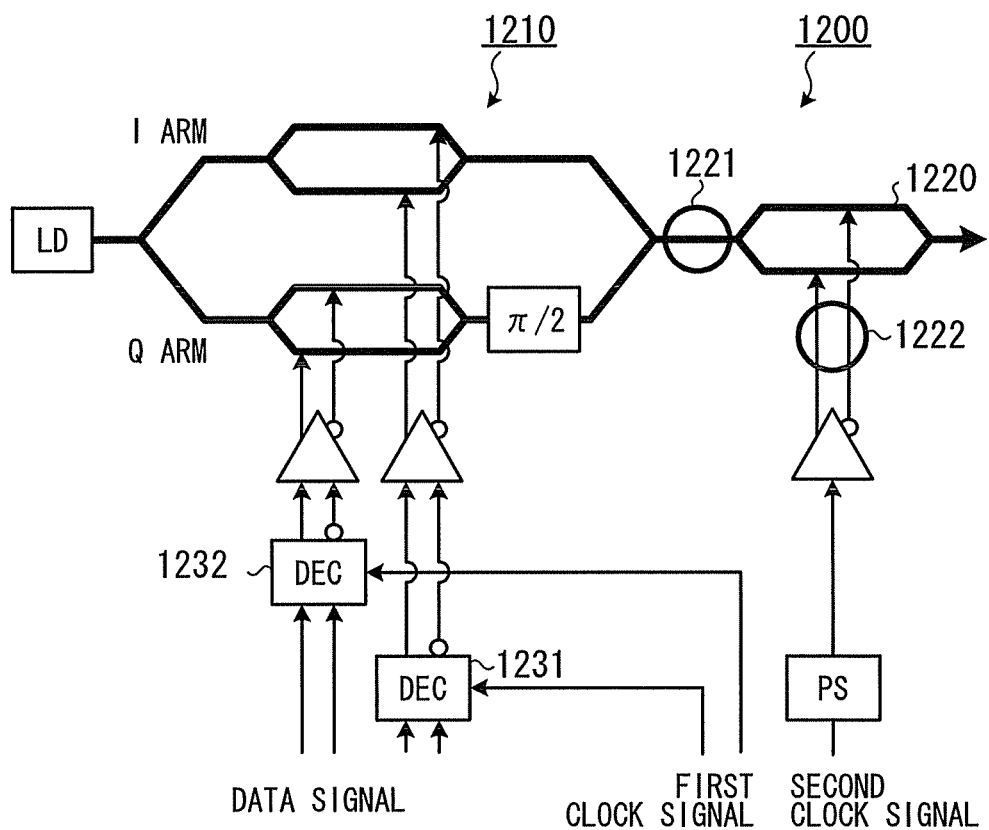
FIG. 12 is a block diagram illustrating a configuration of a typical optical modulation device.
Figure 13:
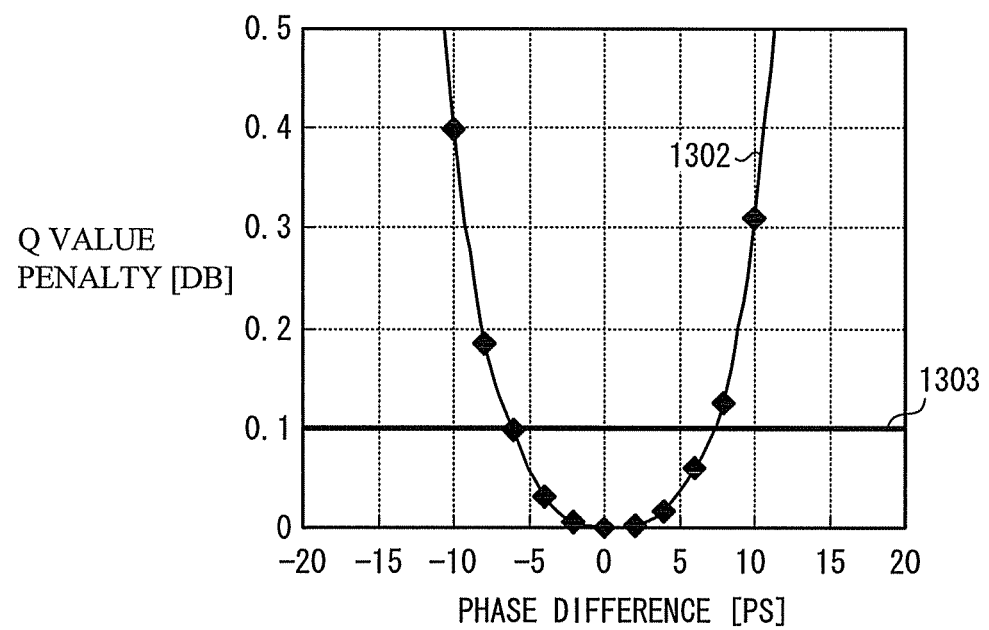
FIG. 13 is a graph describing a relationship between a phase difference and a Q value penalty.
Figure 14:
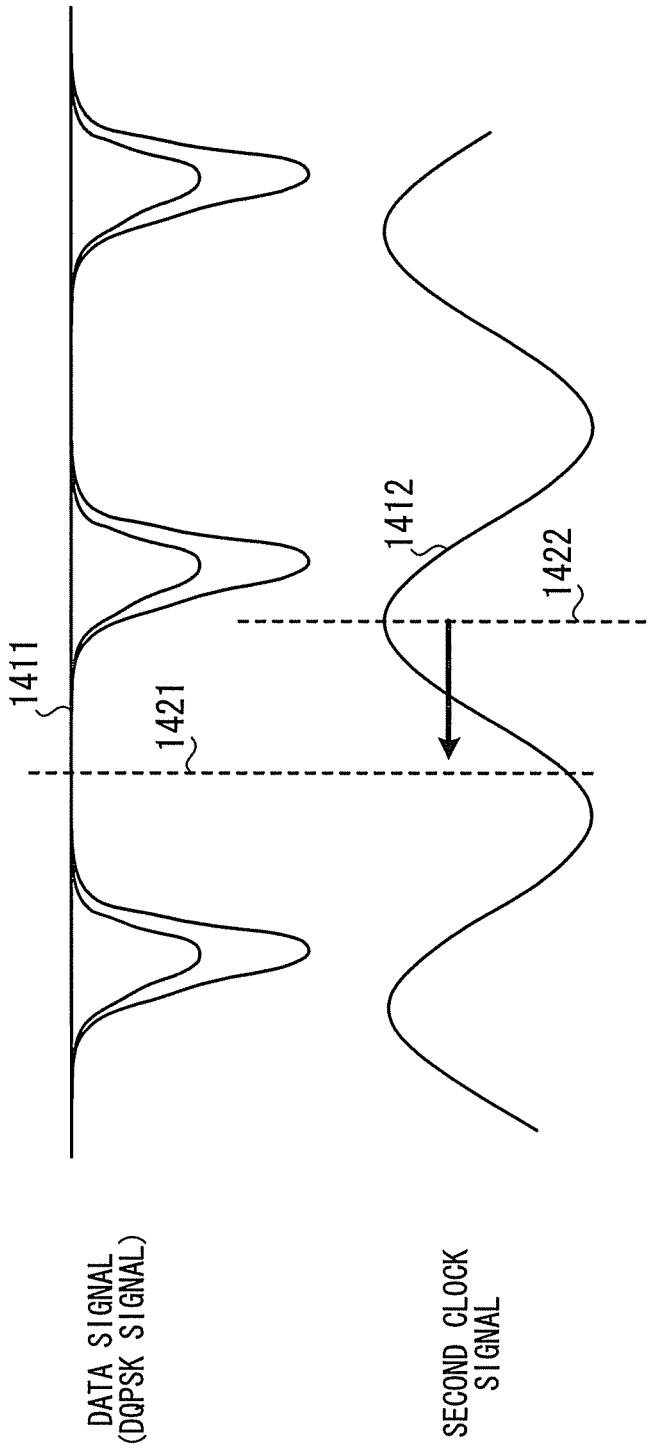
FIG. 14 is a diagram describing an operation performed in changing a phase of a second clock signal.

FIG. 11 is a block diagram illustrating a configuration of an optical modulation device according to an embodiment. In FIG. 11, the same components as those illustrated in FIG. 10 are identified by the same reference numerals, and the description thereof will be omitted. Referring to FIG. 10, the configuration in which the RZ modulator 330 is provided at a subsequent stage of the phase modulator 1010 has been described, but the optical modulation device may alternatively be configured so that the RZ modulator 330 is provided at a preceding stage of the phase modulator 1010. The light source 310 generates a continuous wave light to output the generated light to the RZ modulator 330.

The RZ modulator 330 performs RZ modulation on the optical signal output from the light source 310. The RZ modulator 330 outputs the RZ modulated optical signal to the phase modulator 1010. The phase modulator 1010 performs, based on the data signal output from the driver amplifier 342b, binary phase modulation on the optical signal output from the RZ modulator 330. The phase modulator 1010 outputs the phase modulated optical signal to the outside. The optical coupler 371 branches part of the optical signal to be output to the outside from the phase modulator 1010, and outputs the branched optical signal to the monitoring circuit 372.

As described above, the optical modulation device 100 according to an embodiment enables an increase in the variable width of the compensation amount with respect to the phase difference between the data signal and the second clock signal similarly to the optical modulation device 100 according to the above-described embodiment. Therefore, the modulation characteristic for the optical signal can be improved. Further, it is possible to control the phase difference between the data signal and the second clock signal without degrading the decision quality of the decision circuit 341b for the data signal. Furthermore, the modulation characteristic for the optical signal can be improved even if no new phase shifter is provided.

As described thus far, the optical modulation devices and optical modulation methods disclosed in the present invention are capable of improving the modulation characteristic for the optical signal even if no new phase shifter is provided. It should be noted that in each of the foregoing embodiments, the configuration in which a differential phase shift keying scheme is applied to the first modulator 110 has been described, but a phase modulation scheme such as QPSK or PSK (which is not a differential phase shift keying scheme) may be applied in accordance with a change in the type of an input data signal.

Further, although reference is made to optical modulation device 100 in at least FIGS. 3, 8, 9, 10 and 11, the present invention is not limited to having each of the components shown in these Figures. For example, according to an embodiment an optical modulation device may be implemented as shown in FIG. 3, while another embodiment covers the device shown in FIG. 11.

The following disclosure will be further added with regard to the foregoing embodiments.

The optical modulation devices and optical modulation methods disclosed in the present invention have technical advantages that the improvement in the modulation characteristic for the optical signal is enabled even if no new phase shifter is provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, the scope of which is defined in the claims and their equivalents.

What is claimed is:

1. An optical modulation device, comprising:
   a decision circuit that makes a decision with respect to an input data signal in accordance with a timing of a first clock signal;
   a first modulator that modulates light output based on the data signal by the decision circuit;
   a second modulator that modulates the modulated light in accordance with a timing of a second clock signal; and
   a delay controller that delays the first clock signal within a range of a phase margin of the decision circuit, and delays the second clock signal, thereby controlling a state of a phase difference between the data signal and the second clock signal, and
   wherein the delay controller comprises:
      a first phase shifter that delays the first clock signal;
      a phase detector that acquires a phase difference between the first clock signal that is delayed by the first phase shifter and input to the decision circuit, and the data signal input to the decision circuit;
      a first controller that controls an amount of delay of the first clock signal caused by the first phase shifter and changes the phase difference acquired by the phase detector within the range of the phase margin;
      a second phase shifter that delays the second clock signal; and
      a second controller that controls an amount of delay of the second clock signal caused by the second phase shifter.

2. The optical modulation device according to claim 1, comprising:
   a monitoring unit that monitors the state of the phase difference, and
   wherein the delay controller controls, based on a result of the monitoring, a delay amount of the first clock signal and a delay amount of the second clock signal to decrease the phase difference.

3. The optical modulation device according to claim 1, comprising:
   a monitoring unit including:
      a varying unit that varies a phase of the second clock signal by a predetermined frequency; and
      an extracting unit that extracts, as information indicative of the state of the phase difference, a component of the predetermined frequency of the light modulated by the first modulator and the second modulator, and
   wherein the delay controller controls each of delay amount based on the component extracted by the extracting unit.

4. The optical modulation device according to claim 1, wherein the phase detector acquires, as the phase difference, a value monotonically increasing or monotonically decreasing from a state in which no phase difference exists to a state in which the phase difference is changed in one cycle.

5. The optical modulation device according to claim 2, wherein the delay controller determines whether or not the phase difference monitored by the monitoring unit falls within the range of the phase margin and changes the delay amount of the first clock signal when the phase difference falls within the range of the phase margin, and changes the delay amount of the second clock signal when the phase difference falls outside the range of the phase margin.

6. The optical modulation device according to claim 1, wherein the delay controller determines whether or not the phase difference monitored by the monitoring unit falls within an operating range of the second phase shifter to change the amount of delay of the second clock signal when the phase difference falls within the operating range, and to change the amount of delay of the first clock signal when the phase difference falls outside the operating range.

7. The optical modulation device according to claim 1, wherein the second modulator is an RZ modulator performing RZ modulation on the light based on the second clock signal.

8. The optical modulation device according to claim 1, wherein the decision circuit makes a decision with respect to each of data signals of two channels, serving as the data signal, and
   wherein the first modulator has two Mach-Zehnder interferometers, and is a DQPSK modulator performing differential quadrature phase shift keying on the light based on the data signals of the two channels.

9. The optical modulation device according to claim 1, wherein the first modulator has a Mach-Zehnder interferometer, and is a phase modulator performing phase modulation on the light based on the data signal.

10. An optical modulation method performed by an optical modulation device, the optical modulation method comprising:
    analyzing an input data signal in accordance with a timing of a first clock signal;
    modulating light output based on the analyzing of the data signal and modulating the light in accordance with a timing of a second clock signal;
    monitoring a state of a phase difference between the data signal and the second clock signal; and
    delaying, based on a result of the monitoring, the first clock signal within a range of a preset phase margin, and delaying the second clock signal, thereby controlling the state of the phase difference; and
    wherein the delaying includes:
       delaying the first clock signal by a first phase shifter;
       acquiring, by a phase detector, a phase difference between the first clock signal that is delayed by the first phase shifter and input to the decision circuit, and the data signal input to the decision circuit;
       controlling, by a first controller, an amount of delay of the first clock signal caused by the first phase shifter and changing the phase difference acquired by the phase detector within the range of the phase margin;

delaying, by a second phase shifter, the second clock signal; and controlling, by a second controller, an amount of delay of the second clock signal caused by the second phase shifter.

* * * * *